Figure 1:
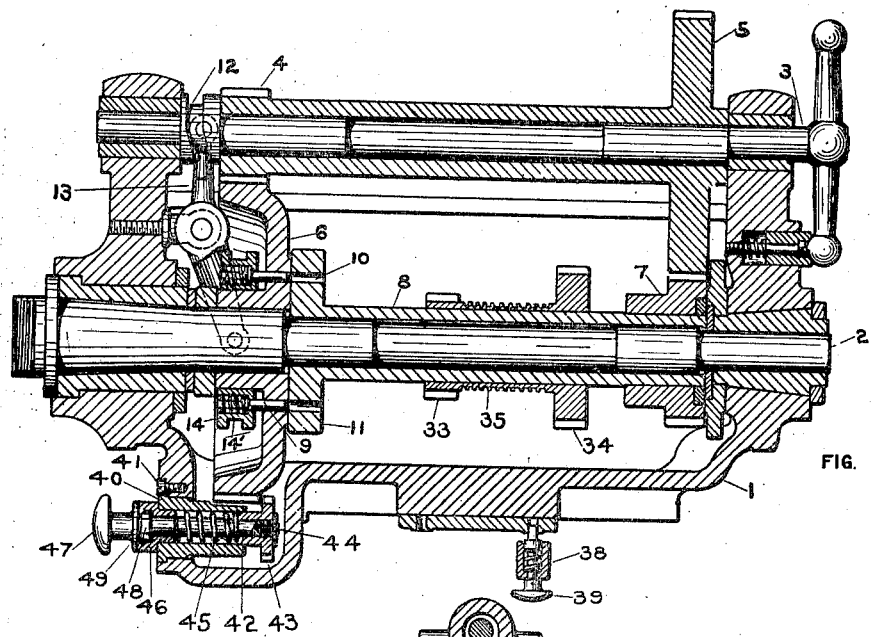

J. PARKER.
GEARING FOR METAL WORKING MACHINES.
APPLICATION FILED DEC. 22, 1906.

1,032,698.

Patented July 16, 1912.

2 SHEETS—SHEET 1.

WITNESSES
J. H. Thurston
C. G. Bradley

INVENTOR
John Parker,
By Wilmarth H. Thurston,
Attorney.

J. PARKER.
GEARING FOR METAL WORKING MACHINES.
APPLICATION FILED DEC. 22, 1906.

1,032,698.

Patented July 16, 1912.
2 SHEETS—SHEET 2.

WITNESSES:
J. H. Thurston
C. G. Bradley

INVENTOR:
John Parker,
By Wilmarth H. Thurston,
Attorney.

UNITED STATES PATENT OFFICE.

JOHN PARKER, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

GEARING FOR METAL-WORKING MACHINES.

1,032,698.

Specification of Letters Patent. Patented July 16, 1912.

Original application filed February 9, 1904, Serial No. 192,852. Divided and this application filed December 22, 1906. Serial No. 349,089.

*To all whom it may concern:*

Be it known that I, JOHN PARKER, of the city and county of Providence and State of Rhode Island, have invented certain new and useful Improvements in Gearing for Metal-Working Machines, of which the following is a specification, the same being a division of my pending application, Serial No. 192,852, filed February 9, 1904.

The invention relates to metal working machines in which a live spindle is employed for carrying either the work or the operating tool, according to the character of the machine. In machines of this character it is frequently desirable to rotate the spindle by hand for the purpose of setting up or adjusting the work with relation to the tool or the tool with relation to the work. In the case of a belt driven machine such rotation of the spindle has been usually effected by manually operating the belt to turn the spindle to the desired position. In many belt driven machines, however, this is inconvenient by reason of the location of the belt with relation to the spindle or to the tool or work carried thereby, and in the case of a motor driven machine rotation of the spindle in this manner is impossible because there is no belt which can be thus manually operated for the purpose.

The object of the present invention is to provide means for manually rotating the spindle of a metal working machine which does not involve the manipulation of the driving belt, and which is therefore applicable not only to belt-driven machines, but also to motor-driven machines.

To that end the invention consists in the combination, with the spindle of a metal working machine, of mechanism whereby the spindle may be manually rotated to adjust the position of the same or for any other desired purpose.

A further feature of the invention consists in locating the means for manually operating the spindle adjacent or in proximity to the front end of the spindle, that is, the end of the spindle which carries the tool or the work, as the case may be.

The invention further consists in the arrangement and combination of parts hereinafter described and claimed.

In the accompanying drawings the invention is shown as applied to a belt driven milling machine, so much of such milling machine being shown as is necessary for an understanding of the invention. In the drawings there is shown in connection with the spindle a variable speed mechanism for changing or varying the speed of said spindle, and such change speed gearing is particularly useful in the case of a motor driven machine and where the motor employed is a constant speed motor.

Figure 2:
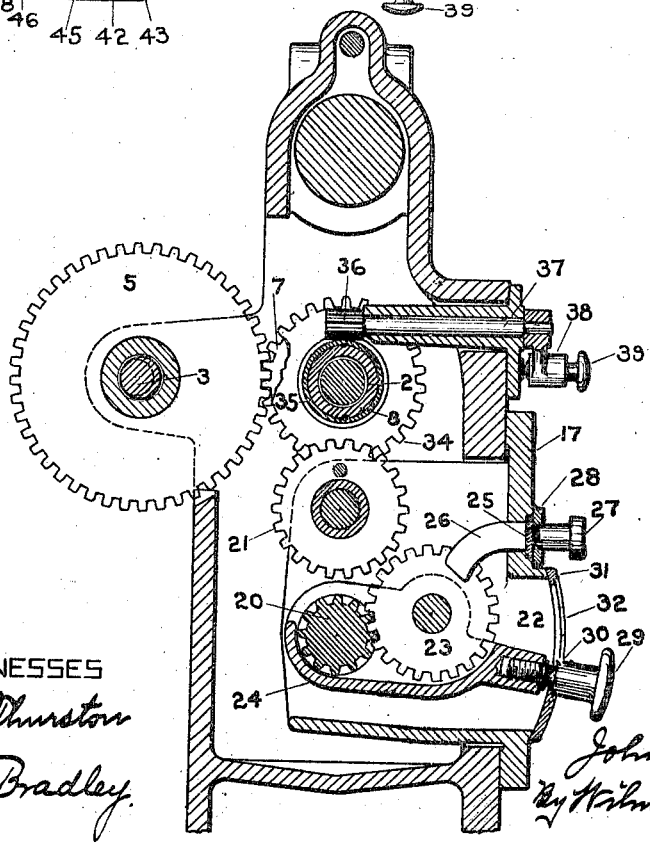
Figure 3:
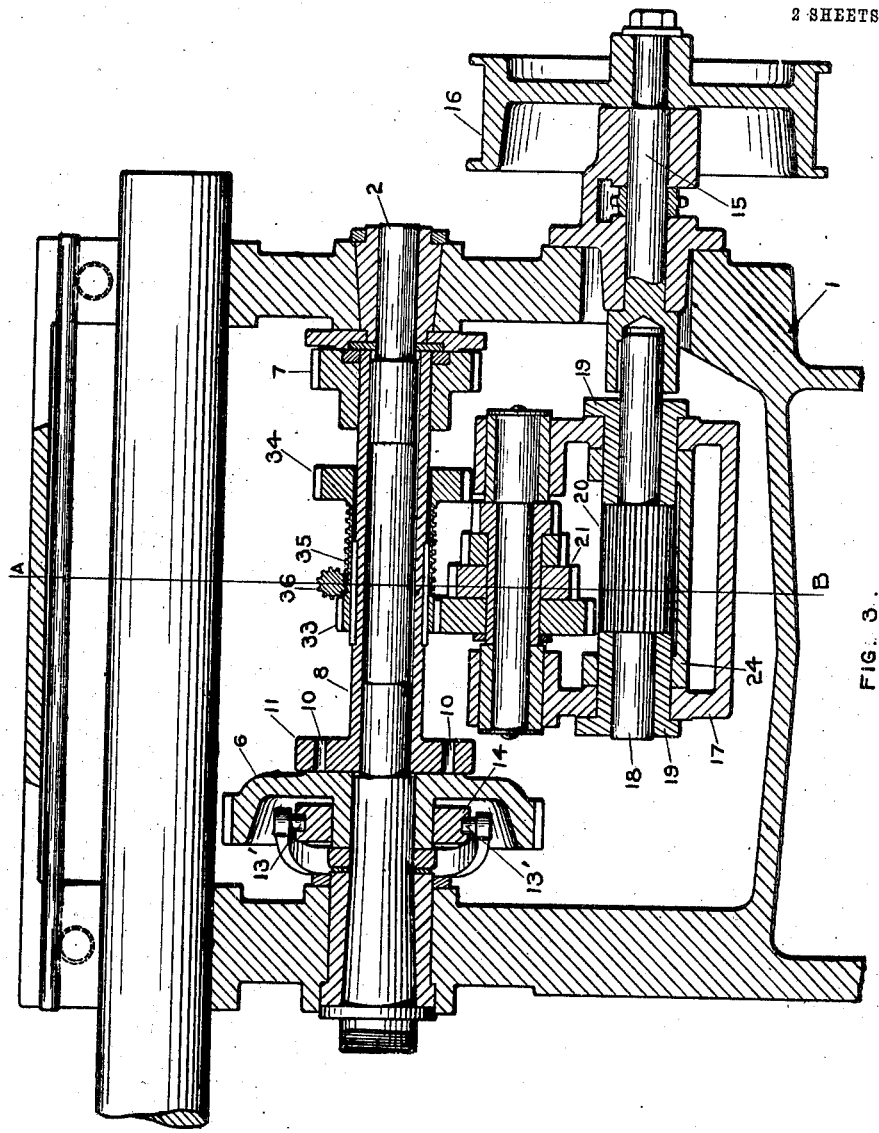

Referring to the drawings, Figure 1 is a horizontal section through the spindle and back gear shaft. Fig. 2 is a transverse vertical section through the spindle and variable speed gearing, on the line A—B, Fig. 3. Fig. 3 is a longitudinal vertical section through the spindle.

Referring to the drawings, 1 represents a portion of the frame of the machine in which is mounted the usual cutter carrying spindle 2 and back gear shaft 3, upon the eccentric portion of which are mounted the back gears 4 and 5. The back gear 4 is arranged to be thrown into and out of engagement with a gear 6 secured to the spindle 2, while the gear 5 is thrown into and out of engagement with a gear 7 secured to a sleeve 8 mounted on the spindle. When the back gears 4 and 5 are thrown out, the driving sleeve 8 is connected directly to the spindle by means of locking pins 9 which pass through holes in the gear 6 and enter holes 10 in a flange 11 formed on the end of the driving sleeve. When the back gears are thrown into engagement with gears 6 and 7, the locking pins 9 are withdrawn from the holes 10 so that the sleeve 8 is disconnected from the spindle and drives the spindle through the back gearing.

In order that the sleeve 8 may be automatically connected with and disconnected from the spindle 2 as the back gears 4 and 5 are thrown out of or into operation, connections are provided between the locking pins 9 and the back gearing shaft 3, whereby the movement of said shaft in throwing the back gears into and out of engagement with the gears 6 and 7 operates the pins 9. These connecting devices consist of a cam 12 secured to the back gear shaft 3 and engaging one end of a lever 13, the opposite end of which is connected with a sleeve 14 in which the pins 9 are mounted. The lever is connected with the sleeve 14 by means of pins 13' (Fig. 3) which engage an annular groove 14' formed in the sleeve 14. The sleeve 14 is mounted upon the hub of the gear 6, and rotates with said gear by reason of the engagement of the pins 9 with the holes in the gear. The pins 9 are spring-mounted in the sleeve 14 so that they may yield as the sleeve 14 is moved forward in case the holes 10 are not in register with the pins when the back gears are thrown out. In such case the pins are forced back against the tension of their springs by engagement with the flange 11, but snap forward into the holes 10 as soon as these holes are brought into register with the pins by the rotation of the sleeve 8.

The driving shaft 15 (Fig. 3) through which power is transmitted to the cutter spindle 2, is driven at a constant speed by means of a belt passing over a pulley 16 secured to the shaft. This constantly driven shaft is connected with the spindle by a variable speed mechanism which is mounted in a suitable box or casing 17 secured to the frame of the machine.

The driving shaft 18 of the variable speed mechanism, which is connected to the driving shaft 15, is mounted in bearing bushings 19 in the casing 17 and between the inner ends of the bushings is provided with an elongated gear or pinion 20. A cone gear 21 comprising four gears of varying size is mounted in the casing 17 opposite the gear 20 and may be connected therewith by an intermediate or tumbler gear 22 (Fig. 2). The gear 22 is mounted upon a stationary shaft 23 carried in a frame 24 which is journaled on the bushings 19, so that the gear 22 remains in engagement with the gear 20 as the frame is swung upon its journals. The gear 22 is loosely mounted upon the shaft 23 and is moved laterally on said shaft to bring it into position to register with any one of the gears in the cone gear 21 by means of a slide 25 mounted in the front of the casing 17 and provided with arms 26 arranged upon opposite sides of the gear. The slide 25 is held in position by the sleeve 27 which is mounted to slide on a stud projecting from the slide 25 through a longitudinal slot in a locking plate 28, said sleeve 27 being adapted to register with locking recesses in the locking plate 28. The frame 24 is swung about its axis to connect the gear 22 with the cone-gear 21 by means of a sleeve 29 mounted to slide on a stud 30 projecting from the frame 24 through a vertical slot in the locking plate 31, said sleeve 29 being adapted to register with locking recesses 32 in the locking plate 31.

The sleeve 8 through which the spindle 2 is driven is connected with the cone gear 21 through one or the other of two gears 33 and 34 which are connected with the sleeve 8. The gears 33 and 34 are connected together by a sleeve 35 so that they form a quill gear and the sleeve 35 is connected with the sleeve 8 so that it may slide longitudinally thereon. The sleeve 35 is moved longitudinally to engage either the gear 33 or the gear 34 with the cone gear 21 by means of a pinion 36 engaging annular teeth formed on the sleeve 35. The pinion 36 is formed on the end of a shaft 37 which is provided with an operating arm 38 and a locking pin 39 at its outer end.

Referring to Fig. 1, there is secured in the frame 1 adjacent the front end of the spindle 2 a bushing 40 which is held in place by a screw 41. Mounted in the bushing 40 is a shaft 42 having a pinion 43 secured to the inner end thereof by means of a screw 44. The pinion 43 is normally held out of engagement with the gear 6 by a spring 45 which is interposed between the hub of the pinion 43 and a bushing 46 secured in the outer end of the bushing 40. The spring 45 acts to hold the pinion 43 in the position shown in Fig. 1. When it is desired to turn or adjust the spindle manually, the shaft 42 is pulled forward, or to the left in Fig. 1, by means of a handle 47, thus bringing the pinion 43 into engagement with the gear 6. This longitudinal movement of the shaft 42 also withdraws the polygonal part 48 of the shaft 42 from a recess in the bushing 46 and into position to be engaged by a wrench or operating handle. When the handle has been applied to the part 48, said handle lies between the end of the bushing 46 and a collar 49 on the shaft 42 and prevents the return of the pinion 43 to normal position under the influence of the spring 45. So long as the handle remains upon the part 48, the shaft 42 may be turned manually by means of said handle to adjust or turn the spindle 2, and when the handle is removed the shaft 42 and pinion 43 will, under the influence of the spring 45, automatically return to normal position.

With the above construction, as will be seen, the spindle may be manually rotated without manipulating the driving belt, and may thus be manually rotated in a machine which has no driving belt. As will be further seen, the location of the mechanism for manually rotating the spindle adjacent or in proximity to the front end of the spindle is particularly advantageous, as it enables the operator to manually rotate the spindle while standing at a position where he can readily observe the position of the tool with relation to the work, or vice versa.

With the construction above described the spindle may be manually rotated either with or without disconnecting the mechanism which connects the spindle with the driving shaft. With the construction shown the spindle may, if desired, be disconnected from the driving shaft, either by moving the arm 38 so as to throw both of the gears 33 and 34 out of engagement with the cone gear 21, or by throwing the intermediate or tumbler gear 22 out of engagement with said cone gear, before manually rotating the spindle. It is found in practice, however, to be unnecessary to thus throw out the connecting mechanism, and the spindle may be manually rotated without throwing out said mechanism.

It will be understood that, while the variable speed mechanism is important to be employed in a machine having a constant speed driving shaft, as in a motor-driven machine, or in the machine shown in the drawings, it is not essential to the invention which may be employed in a machine in which there is no such variable speed mechanism.

What I claim as my invention and desire to secure by Letters Patent is:

1. In a metal working machine, the combination of the live spindle, a constant speed driving shaft for operating said spindle, variable speed mechanism connecting said driving shaft and said spindle, and means adapted to be connected with and disconnected from said spindle for manually adjusting said spindle.

2. In a metal working machine, the combination of the live spindle, a driving shaft for operating said spindle, means for connecting said driving shaft to said spindle and disconnecting it therefrom, and means adapted to be connected with and disconnected from said spindle for manually adjusting said spindle.

3. In a metal working machine, the combination of the live spindle, a gear secured to said spindle and a longitudinally movable shaft a pinion carried by said shaft and adapted to engage the gear on said spindle, said shaft being provided with a polygonal part adapted to be brought by the longitudinal movement of the shaft into position to receive an operating device.

4. In a metal working machine, the combination of the live spindle, a gear secured to said spindle, a longitudinally movable shaft a pinion carried by said shaft and adapted to engage the gear on said spindle, and a spring holding said shaft in normal position, said shaft being provided with a polygonal part adapted to be brought by the longitudinal movement of the shaft into position to receive an operating device.

5. In a metal working machine, the combination of the live spindle, a gear secured to said spindle, a longitudinally movable shaft a pinion carried by said shaft and adapted to engage the gear on said spindle, and a spring holding said shaft in normal position, said shaft being provided with a polygonal part adapted to be brought by the longitudinal movement of the shaft into position to receive an operating device, and with a collar outside of said polygonal part.

JOHN PARKER.

Witnesses:
W. H. THURSTON,
J. H. THURSTON.